(12) United States Patent
Zhu (10) Patent No.: US 10,743,038 B2
(45) Date of Patent: Aug. 11, 2020

(54) LIVE BROADCAST PROCESSING METHOD, APPARATUS, DEVICE, AND STORAGE MEDIUM

(71) Applicant: BEIJING BAIDU NETCOM SCIENCE TECHNOLOGY CO., LTD., Beijing (CN)

(72) Inventor: Zhaomin Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/354,044

(22) Filed: Mar. 14, 2019

(65) Prior Publication Data
US 2019/0364303 A1    Nov. 28, 2019

(30) Foreign Application Priority Data

May 22, 2018    (CN) .......................... 2018 1 0497656

(51) Int. Cl.
*H04N 7/173*    (2011.01)
*H04N 21/233*    (2011.01)
(Continued)

(52) U.S. Cl.
CPC ........... *H04N 21/233* (2013.01); *G06F 40/58* (2020.01); *H04N 21/2187* (2013.01);
(Continued)

(58) Field of Classification Search
CPC ........... H04N 21/233; H04N 21/64322; H04N 21/25841; H04N 21/2393; H04N 21/2368; H04N 21/2187; H04N 21/2343
(Continued)

(56) References Cited

U.S. PATENT DOCUMENTS 7,808,008 B2 *    10/2010    Miyake ................ G09G 3/325
                                                                257/290
8,532,607 B2 *    9/2013     Sennett ................ H04W 4/90
                                                                455/404.1

(Continued)

FOREIGN PATENT DOCUMENTS

CN    1937609 A    3/2007
CN    103916692 A    7/2014
(Continued)

OTHER PUBLICATIONS

The Chinese First Examination Report, including the Search Report, of corresponding Chinese application No. 201810497656.7, dated Mar. 25, 2019.

(Continued)

*Primary Examiner* — Michael B. Pierorazio
(74) *Attorney, Agent, or Firm* — J.C. Patents (57) ABSTRACT

The present application provides a live broadcast processing method, an apparatus, a device, and a storage medium thereof, where the method includes: receiving, by a live broadcast server, source media data sent by a first terminal device of a video live broadcast side, where the source media data includes video data and audio data; translating the audio data into audio data in at least one target language; acquiring a playing language required by a video playing side, and acquiring audio data corresponding to the playing language from the audio data in the at least one target language; merging the audio data corresponding to the playing language with the video data to obtain target media data; and transmitting the target media data to a second terminal device of the video playing side for playback.

8 Claims, 5 Drawing Sheets

(51) Int. Cl.
*H04N 21/2187* (2011.01)
*H04N 21/2368* (2011.01)
*H04N 21/239* (2011.01)
*H04N 21/258* (2011.01)
*H04N 21/643* (2011.01)
*G06F 40/58* (2020.01)

(52) U.S. Cl.
CPC ..... *H04N 21/2368* (2013.01); *H04N 21/2393* (2013.01); *H04N 21/25841* (2013.01); *H04N 21/64322* (2013.01)

(58) Field of Classification Search
USPC .......................................................... 725/93
See application file for complete search history.

(56) References Cited

U.S. PATENT DOCUMENTS

| | | | | |
|---|---|---|---|---|
| 8,572,645 | B2* | 10/2013 | Kim | G08B 27/005 725/32 |
| 2007/0047520 | A1* | 3/2007 | Byers | H04M 3/42357 370/352 |
| 2008/0092159 | A1* | 4/2008 | Dmitriev | G06Q 30/0269 725/34 |
| 2010/0299687 | A1* | 11/2010 | Bertino-Clarke | G06Q 30/0241 725/5 |
| 2011/0088058 | A1* | 4/2011 | Velazquez | H04H 20/59 725/33 |
| 2012/0324505 | A1* | 12/2012 | Casagrande | H04N 5/04 725/32 |
| 2017/0201761 | A1* | 7/2017 | Walker | H04N 19/46 |
| 2018/0192090 | A1* | 7/2018 | Shen | H04N 21/2343 |

FOREIGN PATENT DOCUMENTS

| | | |
|---|---|---|
| CN | 105049950 A | 11/2015 |
| CN | 105340288 A | 2/2016 |
| CN | 205647778 U | 10/2016 |

OTHER PUBLICATIONS

The Chinese Second Examination Report of corresponding Chinese application No. 201810497656.7, dated Jun. 4, 2019.

* cited by examiner

LIVE BROADCAST PROCESSING METHOD, APPARATUS, DEVICE, AND STORAGE MEDIUM

CROSS-REFERENCE TO RELATED APPLICATIONS

This application claims priority to Chinese Patent Application No. 201810497656.7, filed on May 22, 2018, which is hereby incorporated by reference in its entirety.

TECHNICAL FIELD

Embodiments of the present application relate to the field of artificial intelligence (AI) technology, and in particular, to a live broadcast processing method, and an apparatus, a device and a storage medium thereof.

BACKGROUND

With the development of communication and intelligent terminal technology, in addition to using mobile terminals, tablet computers, computers and other intelligent terminal devices for calls or information inquiries, other functions are also more widely used. At present, with the rapid growth of video live broadcast platforms, users who watch live video through the live broadcast platforms are all over the world.

Currently, during a process of video live broadcast, a terminal of a hosting side directly sends recorded audio and video data to a terminal of a playing side for playback, or sends to the terminal of the playing side through a media server for playback. However, users watching the live broadcast may be from all over the world, and may not fully understand the language in the audio and video uploaded by the host, resulting in poor experience in watching the live broadcast.

SUMMARY

Embodiments of the present application provide a live broadcast processing method, and an apparatus, a device and a storage medium thereof to solve the above problem that users watching the live broadcast may be from all over the world, and may not fully understand the language in the audio and video uploaded by the host, resulting in poor experience in watching the live broadcast.

In a first aspect of the present application, a live broadcast processing method is provided, which includes:
receiving source media data sent by a first terminal device of a video live broadcast side, where the source media data includes video data and audio data;
translating the audio data into audio data in at least one target language, where the at least one target language is different from an original language of the audio data;
acquiring a playing language required by a video playing side, and acquiring audio data corresponding to the playing language from the audio data in the at least one target language;
merging the audio data corresponding to the playing language with the video data to obtain target media data; and
transmitting the target media data to a second terminal device of the video playing side.

Optionally, the acquiring a playing language required by a video playing side includes:
determining the playing language of the video playing side according to a geographic location where the video playing side is located.

Optionally, the determining the playing language of the video playing side according to a geographic location where the video playing side is located includes:
obtaining an Internet Protocol (IP) address of the video playing side; and
determining the geographic location of the video playing side according to the IP address, and applying a locally used language corresponding to the geographic location as the playing language.

Optionally, the obtaining an IP address of the video playing side includes:
receiving a live broadcast watching request sent by the second terminal device of the playing side; and
determining the IP address of the video playing side according to the live broadcast watching request.

Optionally, the acquiring a playing language required by a video playing side includes:
receiving a live broadcast watching request sent by the second terminal device of the video playing side, where the playing language is carried in the live broadcast watching request.

In a second aspect of the present application, a live broadcast processing method is provided, which includes:
transmitting a live broadcast watching request to a live broadcast server according to an operation of a user;
receiving target media data returned by the live broadcast server, where a language type of an audio in the target media data is a playing language required by a playing side; and
playing the target media data.

Optionally, the playing language is carried in the live broadcast watching request.

In a third aspect of the present application, a live broadcast processing apparatus is provided, which includes:
a receiving module, configured to receive source media data sent by a first terminal device of a video live broadcast side, where the source media data includes video data and audio data;
a translating module, configured to translate the audio data into audio data in at least one target language, where the at least one target language is different from an original language of the audio data;
a processing module, configured to acquire a playing language required by a video playing side, and acquire audio data corresponding to the playing language from the audio data in the at least one target language;
the processing module is further configured to merge the audio data corresponding to the playing language with the video data to obtain target media data; and
a transmitting module, configured to transmit the target media data to a second terminal device of the video playing side.

Optionally, the processing module is specifically configured to:
determine the playing language of the video playing side according to a geographic location where the video playing side is located.

Optionally, the processing module is specifically configured to:
obtain an IP address of the video playing side; and
determine the geographic location of the video playing side according to the IP address, and apply a locally used language corresponding to the geographic location as the playing language.

Optionally, the receiving module is further configured to receive a live broadcast watching request sent by the second terminal device of the playing side; and the processing module is further configured to determine the IP address of the video playing side according to the live broadcast watching request.

Optionally, the receiving module is further configured to receive a live broadcast watching request sent by the second terminal device of the video playing side, where the playing language is carried in the live broadcast watching request.

In a fourth aspect of the present application, a live broadcast processing device is provided, which includes:

a transmitting module, configured to transmit a live broadcast watching request to a live broadcast server according to an operation of a user;

a receiving module, configured to receive target media data returned by the live broadcast server, where a language type of an audio in the target media data is a playing language required by a playing side; and a playing module, configured to play the target media data.

Optionally, the playing language is carried in the live broadcast watching request.

In a fifth aspect of the present application, a live broadcast server is provided, which includes: a receiver for receiving data, a transmitter for transmitting data, a memory, and a processor;

where the memory is configured to store computer instructions, and the processor is configured to execute the computer instructions stored in the memory to implement a live broadcast processing method according to any one of the first aspect.

In a sixth aspect of the present application, a terminal device is provided, which includes: a receiver for receiving data, a transmitter for transmitting data, a player for playing media data, a memory, and a processor;

where the memory is configured to store computer instructions, and the processor is configured to execute the computer instructions stored in the memory to implement a live broadcast processing method according to any one of the second aspect.

In a seventh aspect of the present application, a storage medium is provided, which includes: a readable storage medium and computer instructions stored in the readable storage medium; where the computer instructions are configured to implement a live broadcast processing method according to the first aspect.

In an eighth aspect of the present application, a storage medium is provided, which includes: a readable storage medium and computer instructions stored in the readable storage medium; where the computer instructions are configured to implement a live broadcast processing method according to the second aspect.

Embodiments of the present application provide a live broadcast processing method, an apparatus, a device, and a storage medium thereof, where a live broadcast server receives source media data sent by a first terminal device of a video live broadcast side, where the source media data includes video data and audio data; translates the audio data into audio data in at least one target language; acquires a playing language required by a video playing side, and acquires audio data corresponding to the playing language from the audio data in the at least one target language; merges the audio data corresponding to the playing language with the video data to obtain target media data; and transmits the target media data to a second terminal device of the video playing side for playback, so that an automatically simultaneous live broadcast in multi-languages can be realized. The live broadcast service can also provide different playing languages according to viewers in different regions, so as to achieve better viewing effects.

BRIEF DESCRIPTION OF DRAWINGS

In order to illustrate the technical solutions of embodiments of the present application or the technical solutions in the prior art more clearly, the drawings, which are used in the descriptions of the embodiments of the present application or the prior art, will be briefly described below. It is obvious that the drawings in the following description are only some embodiments of the present application; other drawings may be obtained by those of ordinary skill in the art without any creative efforts.

DESCRIPTION OF EMBODIMENTS

In order to make the objects, technical solutions and advantages of embodiments of the present application more clear, the technical solutions of embodiments of the present application will be clearly and comprehensively described in the following with reference to the accompanying drawings. It is obvious that the described embodiments are merely a part of, rather than all of, the embodiments of the present application. All other embodiments obtained by those of ordinary skill in the art based on the embodiments of the present application without creative efforts shall fall within the scope of the present application.

In the commonly used manners for live broadcast, a host pushes streams to generate audio and video data, that is, source media data in the following description, where the audio and video data from the host is sent directly to a playing side through wireless transmission, and is played without language switching. Alternatively, source media data (i.e., video streams) from a hosting side is received by a live broadcast server (also referred to as a media server), and at the same time is mixed with audio data from a commentator pushed by a directing side for playback (for example, during a live broadcast of sports, different commentary from different commentators are broadcasted at the same time when images are live broadcasted through different live broadcast lines).

However, there are several problems in the live broadcast manners mentioned above:

1. If during the process of live broadcast, viewers want to listen to the translation of an original language of the host, there has to be a simultaneous interpretation expert who uploads translated audio data to a streaming media platform (such as a live broadcast server).

2. If a live broadcast with multiple languages at the same time is desired, there is a need for multiple simultaneous interpretation experts who upload translated audio data to a streaming media platform (such as a live broadcast server) for process.

3. In fact, such solution is equivalent to a live broadcast of mix streams where a video and multiple audios are pushed simultaneously. In this case, the audios may not be in synchronization with the video, that is, the translated audio cannot match the corresponding images of the video.

4. When the original manner for live broadcast is used directly, users watching the live broadcast may be from all over the world, and may not fully understand the language in the audio and video uploaded by the host, resulting in poor experience in watching the live broadcast.

For the above problems, the present application provides a live broadcast processing method, which automatically implements a multi-language live broadcast method during a live broadcast process, that is, upon receiving live broadcast media data, a live broadcast server (i.e., media service center) translates audio data pushed by a host into a new audio stream in a specified language in real time according to a configuration template on a live broadcast management platform for a client, remixes an audio track of video data for a live broadcast, and transmits it to a terminal device of a playing side for playback, so that an automatically simultaneous live broadcast in multi-languages can be realized. The live broadcast service can also provide different playing languages according to viewers in different regions, so as to achieve better viewing effects.

The live broadcast processing method provided by the present application is described in detail below through several specific embodiments.

Figure 1:
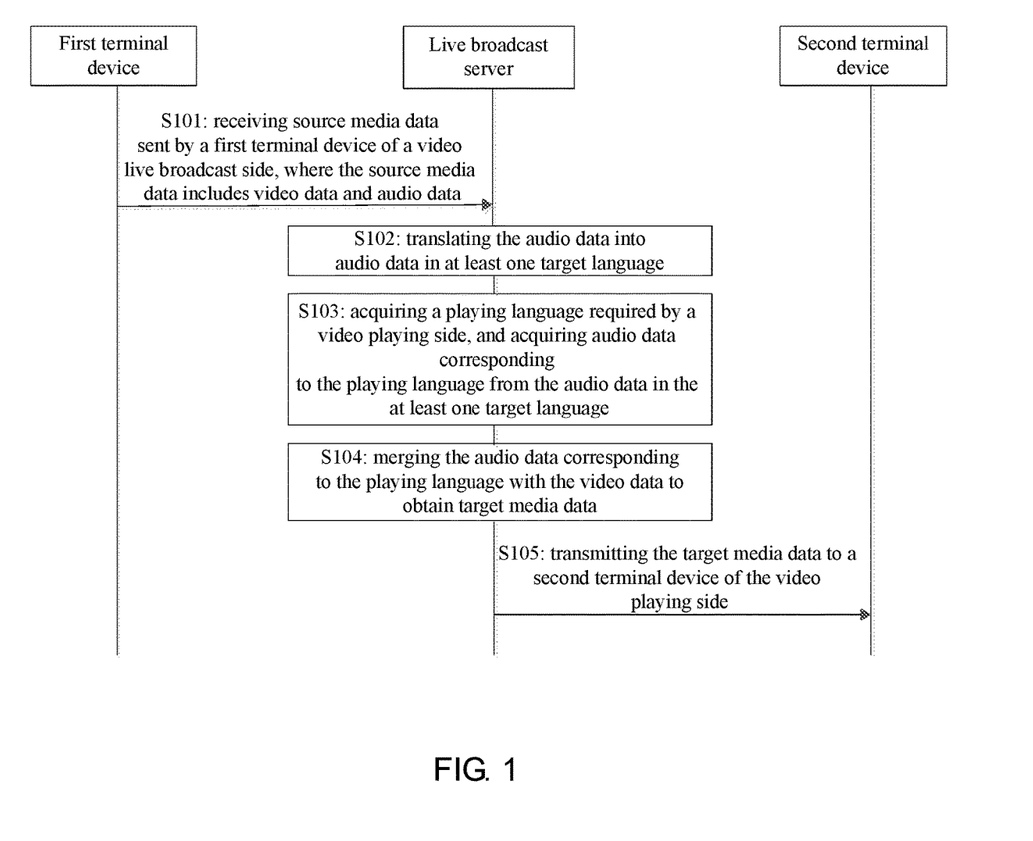
FIG. 1 is a flowchart of Embodiment 1 of a live broadcast processing method according to an embodiment of the present application.

FIG. 1 is a flowchart of Embodiment 1 of a live broadcast processing method according to an embodiment of the present application. As shown in FIG. 1, the live broadcast processing method is applied to a live broadcast scenario, relating to a device of a live broadcast side, a live broadcast server (also referred to as a media server, a media service center, and the like), and a device of a playing side. Specifically, the live broadcast processing method includes the following steps:

S101: receiving source media data sent by a first terminal device of a video live broadcast side, where the source media data includes video data and audio data.

In this step, when a host from the live broadcast side performs live broadcast on a live broadcast client installed on a terminal device, a first terminal device records content to obtain source media data, where the source media data includes video data and audio data, and the first terminal device transmits the source media data to the live broadcast server through the live broadcast client, that is, the live broadcast server receives the source media data sent by the first terminal device, where a language type of the audio data in the source media data is an original language, which refers to the language used by the host, for example, in most live broadcast platforms in China, the host uses Chinese, and the original language is Chinese.

S102: translating the audio data into audio data in at least one target language.

In this step, upon receiving the source media data, the live broadcast server separates the audio data, and translates the audio data into audio data in one or more target languages according to one or more translation lines set in advance. For example, audio data in Chinese can be translated into audio data in English, audio data in Japanese, audio data in Korean, and the like. In this solution, it should be understood that the translation may not be performed if the target language is the same as the original language, that is, at least one target language is different from the original language of the audio data.

S103: acquiring a playing language required by a video playing side, and acquiring audio data corresponding to the playing language from the audio data in the at least one target language.

In this step, after the source media data arrives at the live broadcast server for translation, the live broadcast server needs to acquire a playing language required by different playing sides. Taking one of the playing sides as an example, the live broadcast server needs to determine a playing language required by a user at the playing side, where an approach for the acquiring may be that the playing language is carried in a live broadcast request from a user, or that the playing language is determined according to a position of the playing side, or the playing language may be a default playing language, etc., which is not limited in the present solution.

Upon acquiring the playing language, the live broadcast server needs to select audio data corresponding to the playing language required by the user at the playing side from translated audio data in multiple target languages.

S104: merging the audio data corresponding to the playing language with the video data to obtain target media data.

In this step, the live broadcast server re-merges the selected audio data corresponding to the playing language and the video data in the source media data to obtain the target media data in a language type required by the playing side.

S105: transmitting the target media data to a second terminal device of the video playing side.

After the foregoing process is completed, the obtained target media data is transmitted to a second terminal device of the playing side for playback, that is, the live media server may transmit the target media data to the second terminal device through an interface provided by the live broadcast client.

In the above solution, the user at the video playing side performs operations on the live broadcast client as desired to select live broadcast of a video of interest, where a click operation from the user on the live broadcast client generates a live broadcast watching request, which is then sent to the live broadcast server. After the required target media data is obtained by the live broadcast server, it is returned to the second terminal device, that is, the second terminal device receives the target media data returned by the live broadcast server, where the language type of the audio in the target media data is the playing language required by the playing side. The second terminal device plays the target media data on the live broadcast client to accomplish the watching of live broadcast.

The present embodiment provides a live broadcast processing method, where a live broadcast server receives source media data sent by a first terminal device of a video live broadcast side, where the source media data includes video data and audio data; translates the audio data into audio data in at least one target language; acquires a playing language required by a video playing side, and acquires audio data corresponding to the playing language from the audio data in the at least one target language; merges the audio data with the video data to obtain target media data; and transmits the target media data to a second terminal device of the video playing side for playback, so that an automatically simultaneous live broadcast in multi-languages can be realized. The live broadcast service can also provide different playing languages according to viewers in different regions, so as to achieve better viewing effects.

In the specific implementation of the above Embodiment 1, there may be several ways to acquire a playing language required by a video playing side, which at least includes the following two implementation manners:

In a first implementation manner, the playing language of the video playing side is determined according to a geographic location where the video playing side is located.

The live broadcast server may determine the playing language according to the geographic location where the video playing side is located, which means to set a language used within the region of the geographic location as a default playing language required by the user according to the geographic location where the terminal device of the playing side or the user is located. For example, if the video playing side is located in New York, where a language commonly used in the region is English, then English can be used as the playing language required by the user from the playing side.

In a second implementation manner, a live broadcast watching request sent by the second terminal device of the video playing side is received, where the playing language is carried in the live broadcast watching request.

The live broadcast watching request, which is sent by the second terminal device and received by the live broadcast server, carries the playing language, where a language used in the current region may be set by the second terminal device according to its location by default as the playing language, or the playing language may be a user selection, which is not limited in the present solution.

In the first implementation manner mentioned above, it is necessary for the live broadcast server to determine location information of the video playing side, which can be achieved in multiple manners. For example, the location information can be reported by the terminal device of the video playing side, or obtained by the live broadcast server according to other related information. A commonly used manner is to determine the geographic location by using an IP address, where the specific implementation manner is as follows.

Figure 2:
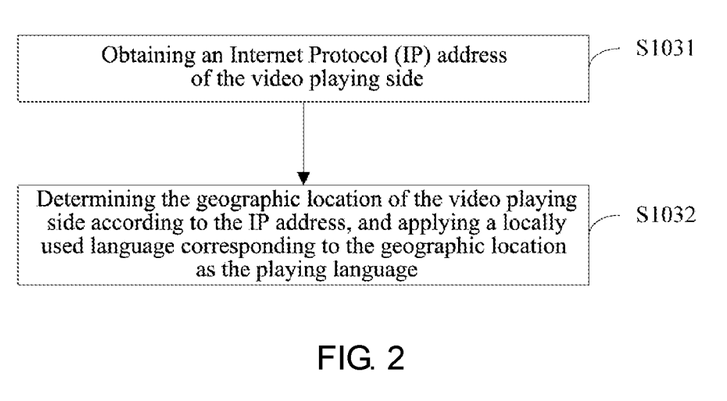
FIG. 2 is a flowchart of Embodiment 2 of a live broadcast processing method according to an embodiment of the present application.

FIG. 2 is a flowchart of Embodiment 2 of a live broadcast processing method according to an embodiment of the present application. As shown in FIG. 2, the live broadcast processing method is applied in a live broadcast server. On the basis of the foregoing embodiment, in the live broadcast processing method provided by the present embodiment, the acquiring a playing language required by a video playing side specifically includes the following steps:

S1031: obtaining an IP address of the video playing side.

In this step, the live broadcast server needs to obtain the IP address of the video playing side. Generally, after the user opens and logs in the live broadcast client, the server may obtain the IP address of the terminal device of the live broadcast playing side according to login information. In the specific implementation, the IP may also be carried in the live broadcast watching request or determined based on related information on the live broadcast watching request. That is, the live broadcast server receives the live broadcast watching request sent by the second terminal device of the playing side, and determines the IP address of the video playing side according to the live broadcast watching request, which is not limited in the present solution.

S1032: determining the geographic location of the video playing side according to the IP address, and applying a locally used language corresponding to the geographic location as the playing language.

Upon obtaining the IP address of the video playing side, the live broadcast server may determine the geographic location of the video playing side according to information on a network and the IP address, and then applies a language used within the region of the geographic location as the playing language required by the user. For example, if the video playing side is located in New York, USA, where the language commonly used in this region is English, then English can be used as the playing language required by the user at the playing side.

The present embodiment provides a live broadcast processing method, where the live broadcast server may determine a playing language required by the user at the playing side according to the geographic location of the video playing side, and may provide different playing language modes according to viewers accessing from different regions, thereby achieving better viewing effects.

Based on the above various embodiments, the live broadcast processing method will be described below with a specific example.

Figure 3:
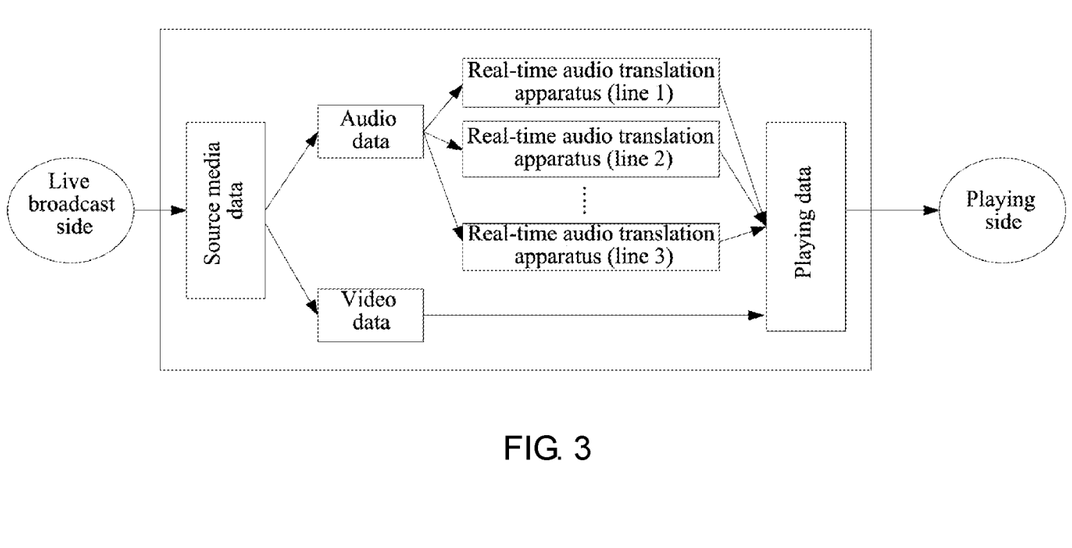
FIG. 3 is a schematic diagram of an implementation process in an example of a live broadcast processing method according to an embodiment of the present application.

FIG. 3 is a schematic diagram of an implementation process in an example of a live broadcast processing method according to an embodiment of the present application. As shown in FIG. 3, blocks represent functions of the live broadcast server. One or more real-time audio translation apparatuses needs to be set in a live broadcast server in advance, which may include a plurality of lines (e.g., Line 1, Line 2 . . . Line n). When the source media data is recorded by a live broadcast side and sent to the live broadcast server (also referred to as a live broadcast service platform, a media service center and the like), the audio data and the video data of the source media data are processed separately, where the audio data is passed into different audio translation lines for translation to obtain audio data in a plurality of different target languages. The live broadcast server determines a playing language required by a playing side, matches it with the plurality of different target languages, and obtains audio data corresponding to the playing language, then re-merges the audio data corresponding to the playing language with the video data to obtain playing data that can be sent to the playing side for playback, i.e., the target media data as mentioned in the above embodiments.

In this solution, an original language and a target language may be configured in a configuration template of the live broadcast server. When a stream pushed by a host is received, a real-time audio processing will be performed according to the previously configured original language and target language. The original language is translated into audio in the target language in real time, which is remixed into an audio track for live broadcast to accomplish synchronized video streaming of one video and a plurality of audios. A translation line may support one or more languages.

The live broadcast service platform (the live broadcast server) may return a default playing language of the playing side according to an accessing region of a viewer. For example, for a viewer accessing from the United States, the default playing language when opening a video is English; the default playing language for an access from China is Chinese. The playing language may also be automatically switched by the viewer to achieve a playback in a different language. Although it takes more time for the audio translation line than the original line, the delay caused by the translation is acceptable due to a strong processing ability of the live broadcast server, besides, the audio and video synchronization is guaranteed from the source.

Moreover, it should be understood that the real-time audio translation apparatus may translate original audio data into audio data in the target language and implant it into a new stream, or translate the original audio data into a text in the target language and implant the text into a new stream for transmission to the playing side, which is not limited in the present solution.

In addition, in the specific implementation of the solution, source data of a live broadcast stream may further include information on the translation line, for example, the live stream is configured with two translation lines: cn and en. The player of the playing side may obtain a corresponding language selection provided by the stream through information on the source data of the stream. If a cn line is provided to a viewer by default according to an ip, the viewer may also set the player's language to switch to the "en" translation line for playback, which is not limited in the present solution.

The present application provides a live broadcast processing method, where a host of a live broadcast side only needs to configure a translation line on a live broadcast platform to enable an automatically simultaneous live broadcast in multi-languages. The live broadcast service can also provide different playing languages according to viewers in different regions, so as to achieve better viewing effects. With the solution, a global live broadcast can make more viewers from the world understand and participate in live activities of the host and improve user experience of users in watching live broadcast.

Figure 4:
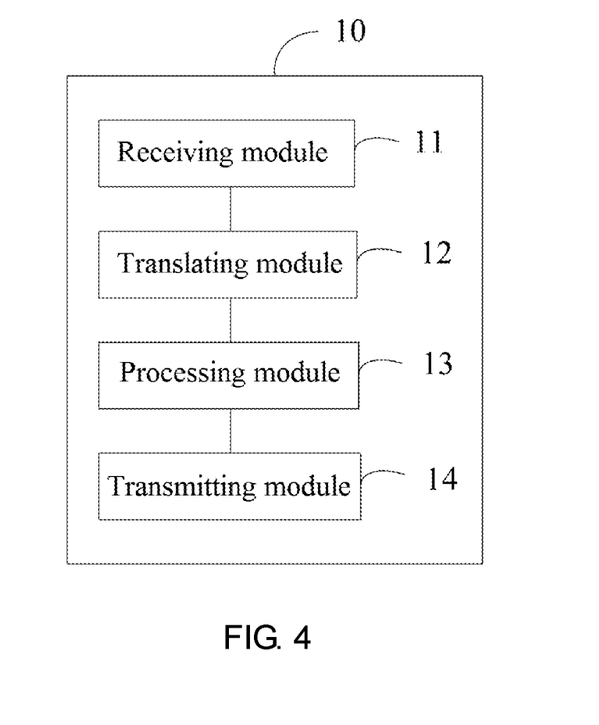
FIG. 4 is a schematic structural diagram of Embodiment 1 of a live broadcast processing apparatus according to an embodiment of the present application.

FIG. 4 is a schematic structural diagram of Embodiment 1 of a live broadcast processing apparatus according to an embodiment of the present application. As shown in FIG. 4, the live broadcast processing apparatus 10 provided in this embodiment includes:

a receiving module 11, configured to receive source media data sent by a first terminal device of a video live broadcast side, where the source media data includes video data and audio data;

a translating module 12, configured to translate the audio data into audio data in at least one target language, where the at least one target language is different from an original language of the audio data;

a processing module 13, configured to acquire a playing language required by a video playing side, and acquire audio data corresponding to the playing language from the audio data in the at least one target language;

the processing module 13 is further configured to merge the audio data corresponding to the playing language with the video data to obtain target media data; and a transmitting module 14, configured to transmit the target media data to a second terminal device of the video playing side.

The live broadcast processing apparatus provided in this embodiment is used to implement a technical solution of the live broadcast server side in any of the foregoing embodiments. The implementation principle and the technical effect are similar. An audio is translated in the live broadcast server by determining a language required by a playing side, so that an automatically simultaneous live broadcast in multi-languages can be realized. The live broadcast service can also provide different playing languages according to viewers in different regions, so as to achieve better viewing effects.

On the basis of the foregoing embodiment, in a specific implementation of the live broadcast processing apparatus 10, the processing module 13 is specifically configured to:

determine the playing language of the video playing side according to a geographic location where the video playing side is located.

Optionally, the processing module 13 is specifically configured to:

obtain an IP address of the video playing side;

determine the geographic location of the video playing side according to the IP address, and apply a locally used language corresponding to the geographic location as the playing language.

Optionally, the receiving module 11 is further configured to receive a live broadcast watching request sent by the second terminal device of the playing side;

the processing module 13 is further configured to determine the IP address of the video playing side according to the live broadcast watching request.

Optionally, the receiving module 11 is further configured to receive a live broadcast watching request sent by the second terminal device of the video playing side, where the playing language is carried in the live broadcast watching request.

The live broadcast processing apparatus provided by the foregoing implementation is used to implement a technical solution of the live broadcast server side according to any of the foregoing method embodiments, and the implementation principle and technical effects are similar, which are not repeated herein.

Figure 5:
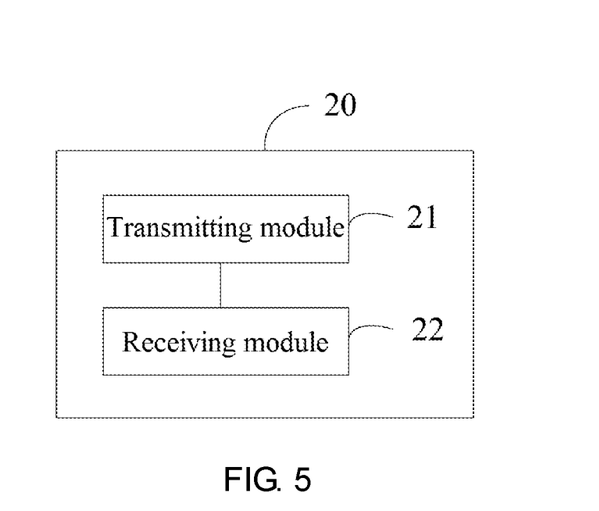
FIG. 5 is a schematic structural diagram of Embodiment 2 of a live broadcast processing apparatus according to an embodiment of the present application.

FIG. 5 is a schematic structural diagram of Embodiment 2 of a live broadcast processing apparatus according to an embodiment of the present application. As shown in FIG. 5, the live broadcast processing apparatus 20 provided in this embodiment includes:

a transmitting module 21, configured to transmit a live broadcast watching request to a live broadcast server according to an operation of a user;

a receiving module 22, configured to receive target media data returned by the live broadcast server, where a language type of an audio in the target media data is a playing language required by a playing side;

a playing module 23, configured to play the target media data.

Optionally, the playing language is carried in the live broadcast watching request.

The live broadcast processing apparatus provided in this embodiment is used to implement a technical solution of the terminal device of the playing side according to any of the foregoing method embodiments, and the implementation principle and technical effects are similar, which are not repeated herein.

Figure 6:
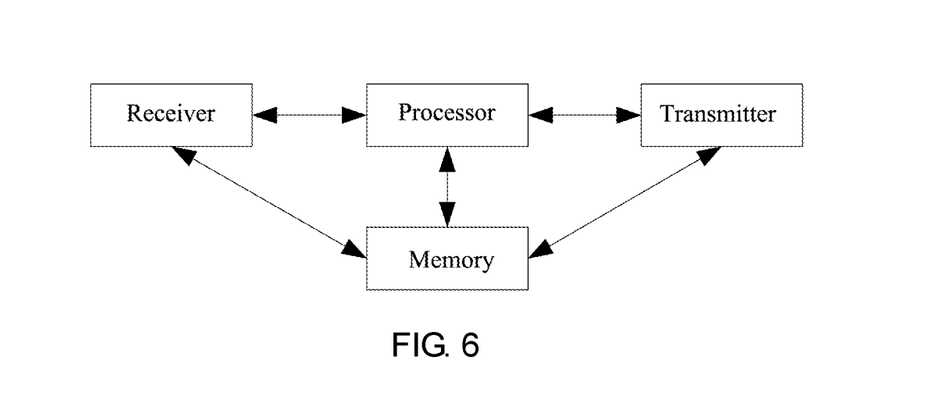
FIG. 6 is a schematic structural diagram of Embodiment 1 of a live broadcast server according to an embodiment of the present application.

FIG. 6 is a schematic structural diagram of Embodiment 1 of a live broadcast server according to an embodiment of the present application. As shown in FIG. 6, the live broadcast server includes at least a receiver for receiving data, a transmitter for transmitting data, a memory, and a processor;

where the memory is configured to store computer instructions, and the processor is configured to execute the computer instructions stored in the memory to implement a technical solution of the live broadcast server side according to any of the foregoing method embodiments.

Figure 7:
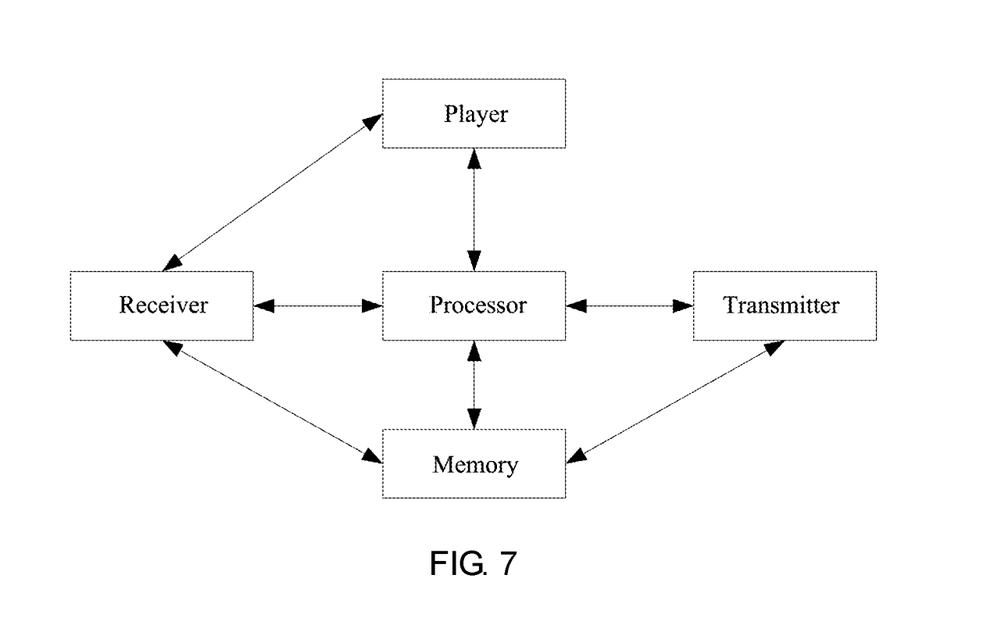
FIG. 7 is a schematic structural diagram of Embodiment 1 of a terminal device according to an embodiment of the present application.

FIG. 7 is a schematic structural diagram of Embodiment 1 of a terminal device according to an embodiment of the present application. As shown in FIG. 7, the terminal device includes at least: a receiver for receiving data, a transmitter for transmitting data, a player for playing media data, a memory, and a processor;

where the memory is configured to store computer instructions, and the processor is configured to execute the computer instructions stored in the memory to implement a technical solution of the terminal device side according to any of the foregoing method embodiments.

The present application further provides a storage medium, including: a readable storage medium and computer instructions stored in the readable storage medium; where the computer instructions are configured to implement a technical solution of the live broadcast server side according to any of the foregoing method embodiments.

The present application also provides a storage medium, including: a readable storage medium and computer instructions stored in the readable storage medium; where the computer instructions are configured to implement a technical solution of the terminal device side according to any of the foregoing method embodiments.

In the specific implementation of the above-mentioned live broadcast server or terminal device, it should be understood that the processor may be a central processing unit (CPU), or other general-purpose processor, a digital signal processor (DSP), an application specific integrated circuit (ASIC), etc. The general purpose processor may be a microprocessor or the processor or any conventional processor or the like. The steps of the method disclosed in the embodiments of the present application may be directly implemented as a hardware processor, or may be performed by a combination of hardware and software modules in the processor.

It will be understood by those skilled in the art that all or part of the steps of implementing the above method embodiments may be performed by hardware related to the program instructions. The aforementioned program can be stored in a computer readable storage medium. The program, when executed, performs steps including the foregoing steps in the method embodiments. The foregoing storage medium includes: read-only memory (ROM), random access memory (RAM), flash memory, hard disk, solid state disk, magnetic tape, floppy disk, optical disc and any combination thereof.

Finally, it should be noted that the above embodiments are only used to illustrate the technical solutions of the present application, but the protection scope of the present application is not limited thereto. Although the present application has been described in detail with reference to the foregoing embodiments, those skilled in the art should understand that the technical solutions described in the foregoing embodiments may be modified, or some or all of the technical features may be equivalently substituted; and the modifications or substitutions do not deviate the nature of the corresponding technical solution from the scope of the technical solutions of various embodiments according to the present application.

What is claimed is:

1. A live broadcast processing method, comprising:
receiving source media data sent by a first terminal device of a video live broadcast side, wherein the source media data comprises video data and audio data;
translating the audio data into audio data in a plurality of target languages, wherein the audio data is input into a plurality of audio translation lines for the translation, and the plurality of target languages are different from an original language of the audio data;
acquiring a playing language required by a video playing side, and acquiring audio data corresponding to the playing language from the audio data in the plurality of target languages;
merging the audio data corresponding to the playing language with the video data to obtain target media data; and
transmitting the target media data to a second terminal device of the video playing side;
wherein the acquiring a playing language required by a video playing side comprises:
determining the playing language of the video playing side according to a geographic location where the video playing side is located.

2. The method according to claim 1, wherein the determining the playing language of the video playing side according to a geographic location where the video playing side is located comprises:
obtaining an Internet Protocol (IP) address of the video playing side; and
determining the geographic location of the video playing side according to the IP address, and applying a locally used language corresponding to the geographic location as the playing language.

3. The method according to claim 2, wherein the obtaining an IP address of the video playing side comprises:
receiving a live broadcast watching request sent by the second terminal device of the playing side; and
determining the IP address of the video playing side according to the live broadcast watching request.

4. A live broadcast server, comprising: a receiver for receiving data, a transmitter for transmitting data, a memory, and a processor;
wherein the memory is configured to store computer instructions, and the processor is configured to execute the computer instructions stored in the memory to implement a live broadcast processing method according to claim 1.

5. A live broadcast processing apparatus, comprising:
a receiver for receiving data, a transmitter for transmitting data, a memory, and a processor;
wherein the receiver is configured to receive source media data sent by a first terminal device of a video live broadcast side, wherein the source media data comprises video data and audio data;
wherein the memory is configured to store computer instructions, and the processor is configured to execute the computer instructions stored in the memory to implement following steps:
translating the audio data into audio data in a plurality of target languages, wherein the audio data is input into a plurality of audio translation lines for the translation and the plurality of target language are different from an original language of the audio data;
acquiring a playing language required by a video playing side, and acquiring audio data corresponding to the playing language from the audio data in the plurality of target languages; and
merging the audio data corresponding to the playing language with the video data to obtain target media data;
wherein the transmitter is configured to transmit the target media data to a second terminal device of the video playing side;

wherein the processor is further configured to determine the playing language of the video playing side according to a geographic location where the video playing side is located.

6. The apparatus according to claim 5, wherein the processor is configured to:
obtain an Internet Protocol (IP) address of the video playing side; and
determine the geographic location of the video playing side according to the IP address, and apply a locally used language corresponding to the geographic location as the playing language.

7. The apparatus according to claim 6, wherein the receiver is further configured to receive a live broadcast watching request sent by the second terminal device of the playing side; and
the processor is further configured to determine the IP address of the video playing side according to the live broadcast watching request.

8. A non-volatile computer readable storage medium, comprising: a non-volatile computer readable storage medium, and computer instructions stored in the non-volatile computer readable storage medium; wherein the computer instructions are configured to implement a live broadcast processing method according to claim 1.

* * * * *